United States Patent Office.

DAN READ, OF HUDSON CITY, NEW JERSEY.

Letters Patent No. 90,022, dated May 11, 1869.

IMPROVED METHOD OF SHEATHING VESSELS, &c.

The Schedule referred to in these Letters Patent and making part of the same.

*To all whom it may concern:*

Be it known that I, DAN READ, of Hudson City, in the State of New Jersey, have invented a new and useful Improvement in the Mode of Sheathing Vessels, &c.; and I do hereby declare that the following is a full and exact description thereof.

My invention relates generally to the covering of surfaces of iron and other metals, and of wood and other substances with sheathing impervious to water, but more especially applicable to the hulls, sides, and decks of vessels exposed to the destructive effects of salt water, atmospheric and climatic changes, and consists in permanently sheathing these exposed surfaces, whether of wood, iron, or other metals or substances, with coverings of preparations composed in whole or in part of gutta-percha, India rubber, or allied gums.

To enable others skilled in the art to practise my invention, I will proceed to describe it.

The sheathing may be prepared in a variety of ways, and in sheets of any desirable and convenient dimensions, and may be of pure gums alone, or of gums mixed with any of the materials well known to persons skilled in the art of compounding such gums and materials for vulcanization, and fully described in the Letters Patent of Goodyear, and John Rider, and others, and vulcanized by the well-known process stated in said patents.

I employ either sheets of the pure gums, or those prepared for vulcanization, and either vulcanized or unvulcanized, according to the purposes to which they are to be applied. In sheathing surfaces constantly exposed to the action of water, such as hulls of vessels, I prepare sheets of the pure gums alone, and for the surfaces exposed to alternate dry and damp, and hot and cold atmospheres, either the compounds prepared for vulcanization, or so prepared and vulcanized.

Having prepared the gums or compounds as above suggested, I convert them into thin sheets, in any of the modes now practised in the manufacture of these gums or compounds into thin fabrics, and proceed to secure them to the surfaces to be sheathed.

For this purpose I prepare a semi-fluid cement by first dissolving the gums above named and referred to in benzole; second, also dissolving some of said gums in bisulphuret of carbon; third, mixing these together, and adding to the mixture Venice turpentine.

In practise I have found the best proportions of these ingredients to be about eight parts of the gum and benzole, one part of gum and bisulphuret of carbon, and one part of Venice turpentine; but these proportions may be varied considerably, as can easily be determined by testing.

Having the sheets of the sheathing prepared and cut to the required size, the cement is applied with a brush, or in any convenient manner, either to the surface to be covered or to the side of the sheet to be brought into contact with such surface, and the sheet applied in the same or similar manner that walls of buildings are covered with paper, care being taken to press every portion of the sheathing firmly to the surfaces, which may be readily done with rollers, flat-irons, or other suitable device.

As a part of the effect of the cement is to soften or partially dissolve the gums or compounds on that part of the sheet with which it comes in contact, of course the sheets of vulcanized gums or compounds will require a greater quantity of the cement than the unvulcanized. Care must be taken, however, not to apply too great a quantity to either, or allow it to remain too long before placing the sheathing in position, as it would become too soft to handle.

Although the best results will be attained by applying the pure gums to surfaces constantly exposed to water, and the vulcanizable or vulcanized compounds to other surfaces, I do not desire to be understood as limiting myself to such applications, as sheets of the compounds may be used with success on the hulls of vessels and other surfaces so exposed.

What I claim as my invention, and desire to secure by Letters Patent, is—

Sheathing the hulls, sides, and decks of vessels, and other surfaces of wood and of iron and other metals, with gutta-percha, India rubber, and allied gums and their vulcanizable and vulcanized compounds, substantially as and for the purposes specified.

This specification signed, this 25th day of March, 1869.

DAN READ. [L. S.]

Witnesses:
ALEX. OSTRANDER,
ANDREW VAN ANTWERP.